US012566615B2

(12) United States Patent
Anand

(10) Patent No.: US 12,566,615 B2
(45) Date of Patent: Mar. 3, 2026

(54) LAST MILE CHURN PREDICTION

(71) Applicant: Intuit Inc., Mountain View, CA (US)

(72) Inventor: Prateek Anand, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 868 days.

(21) Appl. No.: 17/552,629

(22) Filed: Dec. 16, 2021

(65) Prior Publication Data

US 2023/0195476 A1     Jun. 22, 2023

(51) Int. Cl.
*G06F 9/445*        (2018.01)
*G06N 7/01*         (2023.01)

(52) U.S. Cl.
CPC ............... *G06F 9/445* (2013.01); *G06N 7/01* (2023.01)

(58) Field of Classification Search
CPC .......... G06F 9/445; G06N 7/01; G06N 3/049; G06N 3/0464; G06N 3/084; G06Q 30/0202
See application file for complete search history.

(56) References Cited

U.S. PATENT DOCUMENTS

| | | | |
|---|---|---|---|
| 10,162,734 B1 * | 12/2018 | Podgorny ............ | G06Q 40/123 |
| 2011/0218955 A1 * | 9/2011 | Tang ........................ | G06F 15/16 |
| | | | 709/224 |
| 2015/0371163 A1 * | 12/2015 | Noh ................... | G06Q 10/0635 |
| | | | 705/7.28 |
| 2018/0253637 A1 * | 9/2018 | Zhu ........................ | H04L 67/535 |
| 2018/0314577 A1 * | 11/2018 | Gorjiara ................. | G06F 11/36 |
| 2021/0142181 A1 * | 5/2021 | Liu ........................ | G06N 3/045 |
| 2021/0264322 A1 * | 8/2021 | Markhasin ............. | G06V 10/80 |
| 2022/0309618 A1 * | 9/2022 | DeLaRosa ............... | G06N 3/09 |
| 2022/0366040 A1 * | 11/2022 | Marbouti ............... | G06N 3/045 |
| 2023/0043820 A1 * | 2/2023 | Chandran .......... | G06Q 30/0255 |

* cited by examiner

*Primary Examiner* — Jorge A Chu Joy-Davila
(74) *Attorney, Agent, or Firm* — Lathrop GPM LLP

(57) ABSTRACT

A method implements last mile churn prediction. The method includes retrieving data during a user session in response to a trigger. The data includes a list of screen identifiers and a corresponding list of timestamps. The method further includes converting the list of timestamps to a list of time deltas. The list of time deltas includes a time delta that identifies an amount of time between two timestamps of the list of timestamps. The method further includes generating a churn risk from the list of screen identifiers and the list of time deltas. The churn risk identifies a probability that the user session will be terminated. The method further includes transmitting an intervention to intervene in the user session based on the churn risk.

18 Claims, 5 Drawing Sheets

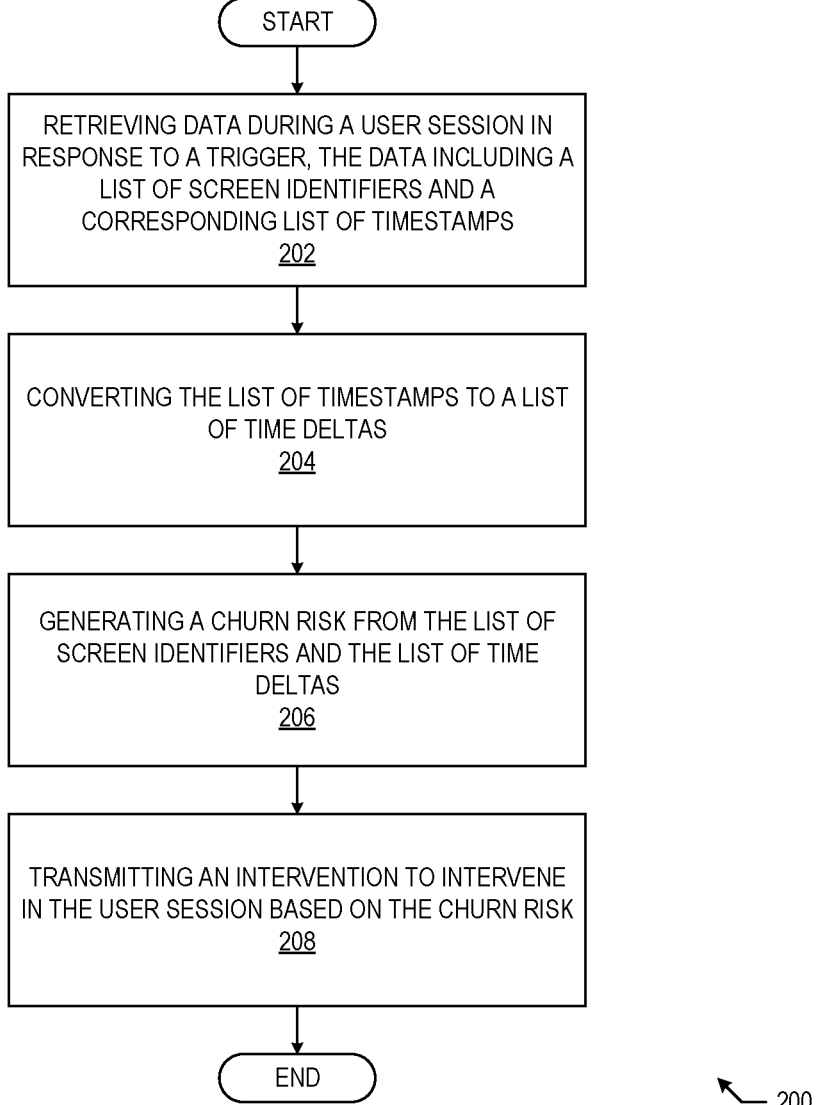

START

RETRIEVING DATA DURING A USER SESSION IN RESPONSE TO A TRIGGER, THE DATA INCLUDING A LIST OF SCREEN IDENTIFIERS AND A CORRESPONDING LIST OF TIMESTAMPS
202

CONVERTING THE LIST OF TIMESTAMPS TO A LIST OF TIME DELTAS
204

GENERATING A CHURN RISK FROM THE LIST OF SCREEN IDENTIFIERS AND THE LIST OF TIME DELTAS
206

TRANSMITTING AN INTERVENTION TO INTERVENE IN THE USER SESSION BASED ON THE CHURN RISK
208

END

500
COMPUTING
SYSTEM

508
OUTPUT DEVICE(S)

504
NON-PERSISTENT
STORAGE

502
COMPUTER
PROCESSOR(S)

506
PERSISTENT
STORAGE

512
COMMUNICATION
INTERFACE

510
INPUT DEVICE(S)

520
NETWORK

522
NODE X

524
NODE Y

526
CLIENT DEVICE

LAST MILE CHURN PREDICTION

BACKGROUND

Users use local applications and online websites and services to track and process information. A user initiates a session by starting an application on a computing device, which may connect to a server, and may terminate a session by closing the application or turning off the computing device. If a user gets frustrated or does not understand how to proceed with the application, website, or service, the user may end the session prematurely. A challenge is for computing systems to identify whether a user is going to end a session and whether to intervene in the session to prevent the termination of the session.

SUMMARY

In general, in one or more aspects, the disclosure relates to a method implementing last mile churn prediction. The method includes retrieving data during a user session in response to a trigger. The data includes a list of screen identifiers and a corresponding list of timestamps. The method further includes converting the list of timestamps to a list of time deltas. The list of time deltas includes a delta that identifies an amount of time between two timestamps of the list of timestamps. The method further includes generating a churn risk from the list of screen identifiers and the list of time deltas. The churn risk identifies a probability that the user session will be terminated. The method further includes transmitting an intervention to intervene in the user session based on the churn risk.

In general, in one or more aspects, the disclosure relates to a system implementing last mile churn prediction. A risk controller is configured to generate a churn risk. An intervention controller is configured to generate an intervention. A server application executes on one or more servers and is configured to retrieve data during a user session in response to a trigger. The data including a list of screen identifiers and a corresponding list of timestamps. The server application further executes to convert the list of timestamps to a list of time deltas. The server application further executes to generate, using the risk controller, the churn risk from the list of screen identifiers and the list of time deltas. The server application further executes to transmit, using the intervention controller, the intervention to intervene in the user session based on the churn risk.

In general, in one or more aspects, the disclosure relates to a method using last mile churn prediction. The method includes accessing a screen as part of a user session. Data is retrieved during the user session in response to a trigger. The data includes a list of screen identifiers and a corresponding list of timestamps. The list of timestamps is converted to a list of time deltas. A churn risk is generated from the list of screen identifiers and the list of time deltas. An intervention is generated to intervene in the user session based on the churn risk. The method further includes displaying the intervention.

Other aspects of the invention will be apparent from the following description and the appended claims.

BRIEF DESCRIPTION OF DRAWINGS

FIG. 2 shows a flowchart in accordance with disclosed embodiments.

DETAILED DESCRIPTION

Figure 1:
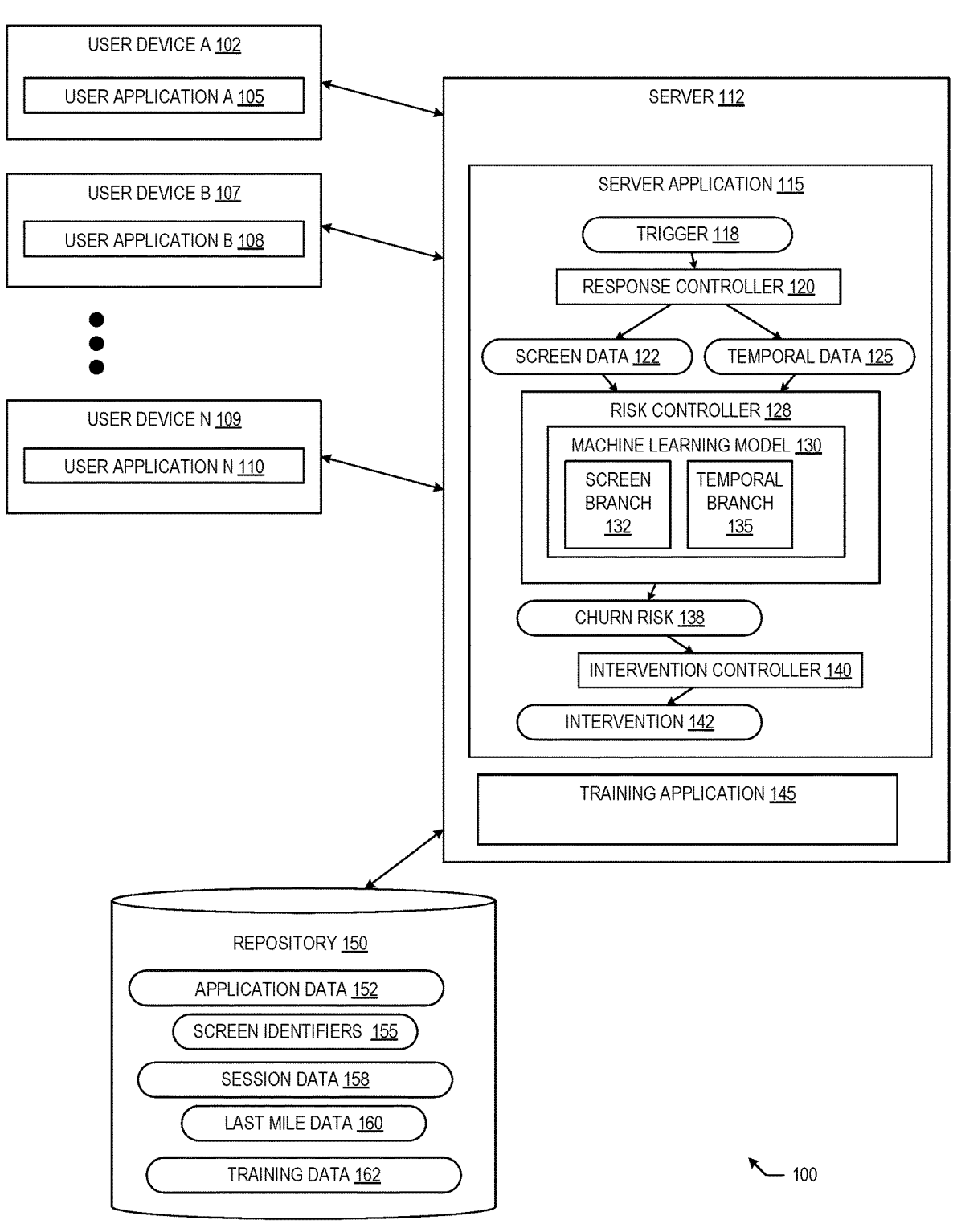
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure use last mile churn prediction to determine when to intervene in a user session to prevent the user from prematurely ending the session. When the system predicts that a user has a high churn risk (i.e., a high probability that a user will terminate a session), the system may generate an intervention to prevent the user from terminating the session.

For example, a user may use a web application to prepare a tax form. If the user reaches a particular screen in the web application or spends too much time on a screen of the web application, then the system may identify the churn risk of the user. The churn risk is based on which screens the user has seen and the amount of time taken by the user to view the screens. If the churn risk is too high, then the web application may intervene by offering a discount or offer to connect the user to a live agent to help the user complete the session.

Churn prediction is the prediction of whether the user will end the session, which may be quantified with the churn risk. The churn risk may be a probability with a value between 0 and 1. The churn prediction is based on last mile data, which is generated from the "last mile" of the clickstream of a user. The click stream is a record of the clicks, events, user inputs, etc., of a user as an application is being used.

The "last mile" of the click stream is a threshold amount of information from the tail end of a clickstream of a session. For example, the last mile may include events from the last 30 minutes of a session, may include the last 50 user inputs before a session was terminated, etc. A session may be terminated by timing out or by the user explicitly ending the session (e.g., by clicking on a button of a user interface).

FIG. 1 shows a diagram of embodiments that are in accordance with the disclosure. FIG. 1 shows the system (100) that uses last mile churn prediction to intervene in user sessions.

Embodiments of FIG. 1 may be combined and may include or be included within the features and embodiments described in the other figures of the application. The features and elements of FIG. 1 are, individually and as a combination, improvements to user response and machine learning technology and computing systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) uses last mile churn prediction to handle sessions initiated by the users of the system (100). In one embodiment, users interact with the server (112) to fill out fields of forms with the user devices A (102) and B (107) through N (109). In one embodiment, the system (100) is an interactive system that presents questions to users and receives responses during the sessions between the server (112) and the user devices A (102) and B (107) through N (109). As an example, the system (100) may be used by the users to fill out tax forms by answering questions presented by the system (100). In one embodiment, the system (100) may be an interactive voice response (IVR) system and the questions may be answered with vocal utterances from the users that are converted into text. In one embodiment, the system (100) hosts a website, and the answers are provided with human input devices (mouses, keyboards, etc.). The system (100) includes the user devices A (102) and B (107) through N (109), the server (112), and the repository (150).

In one embodiment, a session may be prematurely terminated when the user ends the session without providing enough information for the server application (115) to complete a process. For example, the user may end a session by closing the user application A (105) before answering a question from the server application (115) about an amount of capital gains. Without the information, the server (112) may be unable to complete processing a tax form for the user.

Figures 5A, 5B:
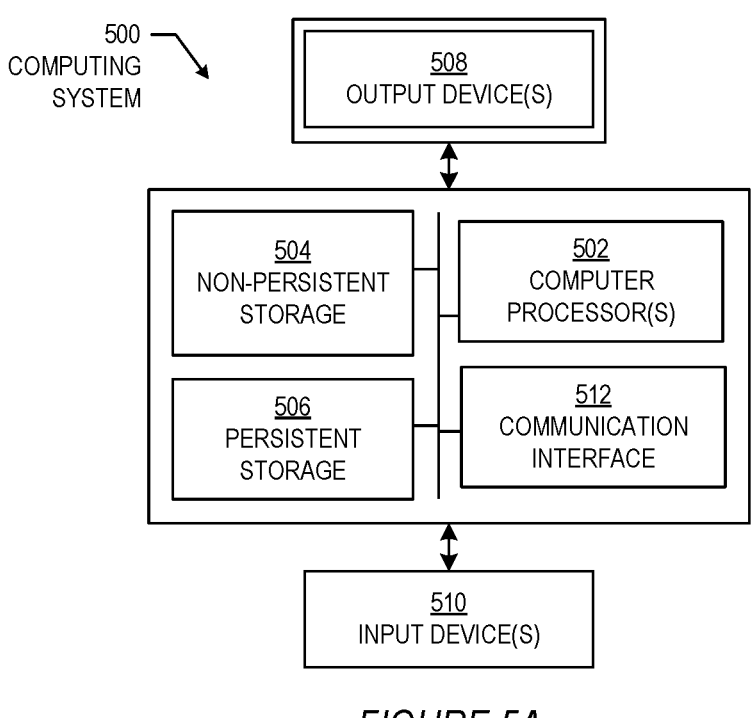
FIG. 5A and FIG. 5B show computing systems in accordance with disclosed embodiments.

The user devices A (102) and B (107) through N (109) are computing systems (further described in FIG. 5A). For example, the user devices A (102) and B (107) through N (109) may be desktop computers, mobile devices, laptop computers, tablet computers, etc. The user devices A (102) and B (107) through N (109) include hardware components and software components that operate as part of the system (100). The user devices A (102) and B (107) through N (109) communicate with the server (112) to display and manipulate the application data (152) stored in the repository (150) and control the machine learning model (130) used by the system (100). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment the user applications A (105) and B (108) through N (110) include web browser programs that display web pages from the server (112).

In one embodiment, the user device A (102) and B (107) may be used by a taxpayer to provide tax information for a tax form hosted by the server (112). The user may load a website hosted by the server (112). The website displays questions for fields for forms requesting information from the taxpayer. The user provides responses that include answers to the questions and the responses are sent to the server (112).

The user device N (109) may be used by a developer to control the hardware and software components of the system (100). In one embodiment, the developer using the user device N (109) may control the timing and training of the machine learning model (130) using the training application (145).

The server (112) is a computing system (further described in FIG. 5A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115) and the training application (145).

The server application (115) is a collection of programs that may execute on multiple servers of a cloud environment, including the server (112). In one embodiment, the server application (115) hosts websites and intervenes in sessions between the server (112) and the user devices A (102) and B (107) to prevent users from prematurely terminating sessions. The websites hosted by the server application (115) may serve structured documents (e.g., HTML pages, XML pages, JSON (JavaScript object notation) files and messages, etc.). The server application (115) includes the response controller (120), the risk controller (128), and the intervention controller (140).

The trigger (118) initiates the calculation of the churn risk (138). In one embodiment, the trigger (118) is a message generated by the system (100) based on a timer or based on a screen identifier. The system (100) may use multiple triggers.

When the trigger (118) is based on a timer, the trigger (118) may be activated (and trigger the process to generate the churn risk (138)) in response to expiration of a threshold amount of time. For example, a user may be using the system and not provide input for a 10 minute threshold of time. In response to the expiration of the threshold amount of time, the system (100) generates the trigger (118).

When the trigger is screen identifier based, the trigger (118) may be activated (and trigger the process to generate the churn risk (138)) in response to a screen identifier. The screen identifier corresponds to one of the scree identifiers (155) and identifies a unique screen (or web page) presented by the server application (115). When a user accesses pages linked certain screen identifiers, the system (100) generates the trigger (118) to initiate the process to calculate the churn risk (138).

The response controller (120) is a set of hardware and software components of the server application (115). The response controller (120) loads a predetermined amount of application data (152) as the screen data (122) and the temporal data (125) in response to the trigger (118). For example, the response controller (120) may load the last 50 screen identifiers of a session with a user as the screen data (122) and the corresponding timestamps as the temporal data (125).

The screen data (122) is part of the last mile data (160) for a particular user session. In one embodiment, the screen data (122) includes a list of a screen identifiers. The screen identifiers from the list of screen identifiers of the screen data (122) identify the screens a user has accessed with the system (100). In one embodiment, a screen is a view of a set of one or more web pages, defined in the application data (152), that are rendered and displayed as a "screen" to the user. For example, a screen may be rendered from multiple files transmitted to the user device A (102) that request that the user enter dependent or capital gains information for a tax form. The screen for the dependent information may be different from the screen for the capital gains information.

The temporal data (125) is also part of the last mile data (160) for a particular user session. The temporal data (125) identifies when a screen has been accessed by the user. In one embodiment, the temporal data (125) includes a list of timestamps (including the date and time) in which the timestamps identify when the screens, corresponding to the list of screen identifiers from the screen data (122), were accessed.

The risk controller (128) is a set of hardware and software components of the server application (115). The risk controller (128) generates the churn risk (138) from the screen data (122) and the temporal data (125) using the machine learning model (130). In one embodiment, the risk controller (128) converts the list of timestamps, from the temporal data (125), to a list of time deltas. The time deltas identify the amounts of time between the timestamps in the temporal data. For example, the list of timestamps "1635890988, 1635891050, 1635891129" may be converted to the list of time deltas "62, 79". The list of time deltas "62, 79" indicates that 62 seconds elapsed between the first and second timestamps and 79 seconds elapsed between the second and third timestamps.

The machine learning model (130) uses a machine learning algorithm to generate the churn risk (138) from the screen data (122) and the temporal data (125). In one embodiment, the machine learning model (130) uses a neural network algorithm with multiple layers. In one embodiment, the layers may include convolutional neural network layers, pooling layers, concatenation layers, and dense layers (also referred to as fully connected layers). The machine learning model (130) includes the screen branch (132) and the temporal branch (135).

The screen branch (132) is a portion of the machine learning model (130) that processes the screen data (122). In one embodiment, the screen branch (132) may apply multiple convolutional neural network layers and pooling layers to the list of screen identifiers from the screen data (122).

The temporal branch (135) is a portion of the machine learning model (130) that processes the temporal data (125). In one embodiment, the temporal branch (135) may apply multiple convolutional neural network layers and pooling layers to the list of time deltas generated from the temporal data (125).

In one embodiment, the temporal branch (135) may use data with a different format than that used by the screen branch (132). For example, the screen branch (132) may take as input a list of 50 values (e.g., screen identifiers from the screen data (122)) and the temporal branch (135) may take as input a list of 49 values (e.g., time deltas from the temporal data (125)).

In one embodiment, the machine learning model (130) generates the churn risk (138) by combining outputs from the screen branch (132) and the temporal branch (135). For example, the machine learning model (130) may apply concatenation and dense layers to the outputs from the screen branch (132) and the temporal branch (135) to generate the churn risk (138).

The churn risk (138) is a probability that identifies the risk that a user will prematurely terminate a session. In one embodiment, the churn risk (138) is a value from 0 to 1.

The intervention controller (140) is a set of hardware and software components of the server application (115). The intervention controller (140) generates the intervention (142) in response to the churn risk (138). In one embodiment, the intervention (142) may be generated when the churn risk (138) satisfies a threshold value (e.g., is greater than 0.5, which corresponds to a 50% chance that the user will end the session prematurely)

The intervention (142) is generated by the intervention controller (140) based on the churn risk (138). In one embodiment, the intervention (142) includes a message for the user of the system that is presented to reduce the likelihood that the user will end the session. In one embodiment, the message forming the intervention (142) is transmitted from the server (112) to the user device A (102) in response to the churn risk (138) satisfying a threshold.

In one embodiment, the intervention (142) includes an offer to reduce a price for the services provided by the system (100). For example, the intervention (142) may include a discount for tax preparation and filing services hosted and performed by the system (100).

In one embodiment, the intervention (142) includes a request to communicate with a subject matter expert about the services provided by the system (100). For example, the intervention (142) may transmit a request that pops up on the user device A (102) to talk with an expert (e.g., tax preparation professional) about the information to provide in response to a screen presented to the user.

The training application (145) is a collection of programs that may execute on multiple servers of a cloud environment, including the server (112). The training application (145) trains the machine learning model (130) with the training data (162) to generate the churn risk (138) from the screen data (122) and the temporal data (125). In one embodiment, the training application uses supervised learning to train the machine learn model (130) with the training data (162), which includes historical examples of the screen data (122) and the temporal data (125) with labels. In one embodiment, the training application uses backpropagation to update the values for the weights of the layers of a neural network model that forms the machine learning model (130).

The repository (150) is a computing system that may include multiple computing devices in accordance with the computing system (500) and the nodes (522) and (524) described below in FIGS. 5A and 5B. The repository (150) may be hosted by a cloud services provider that also hosts the server (112). The cloud services provider may provide hosting, virtualization, and data storage services as well as other cloud services and to operate and control the data, programs, and applications that store and retrieve data from the repository (150). The data in the repository (150) includes the application data (152), the screen identifiers (155), the session data (158), the last mile data (160), the training data (162), etc.

The application data (152) is the data that defines the application hosted by the system (100). The application data (152) includes the web pages (also referred to as screens) that are presented to the users of the system. In one embodiment, each unique screen is linked to a unique screen identifier of the screen identifiers (155).

The screen identifiers (155) are part of the application data (152) and identify the different screens a user may access when using the server application (115). In one embodiment, each of the screen identifiers (155) may be a number (e.g., a unique integer) assigned to a particular screen. In one embodiment, a screen identifier for a screen may be generated by hashing the one or more web pages that are rendered to generate the screen displayed to a user.

The session data (158) records the data transferred during the sessions with the users of the system. The session data includes, for each user, the screen identifiers (155) of the screens the users have accessed, and timestamps for when the screens are accessed.

The last mile data (160) is a threshold amount of the session data (158) for the users of the system (100). For example, the threshold amount may define that the last mile data for one user includes the last 50 screen identifiers (and timestamps) of the screens accessed by a user.

The training data (162) includes the data used to train the machine learning model (130). The training data (162) last mile data from previous user sessions along with labels identifying whether the user terminated the session.

Although shown using a distributed computing architectures and systems, other architectures and systems may be used. In one embodiment, the server application (115) may be part of a monolithic application that performs last mile churn prediction. In one embodiment, the user applications A (105) and B (108) through N (110) may be part of a monolithic applications that perform last mile churn prediction without the server application (115).

FIG. 2 shows a flowchart of a process in accordance with the disclosure. FIG. 2 illustrates the process (200) to generate last mile churn predictions. The embodiments of FIG. 2 may be combined and may include or be included within the features and embodiments described in the other figures of the application. The features of FIG. 2 are, individually and as an ordered combination, improvements to user response and machine learning technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2, the process (200) uses last mile churn prediction to intervene in a session. The process (200) may be performed by a server computer.

At Step 202, data is retrieved during a user session in response to a trigger. The data includes a list of screen identifiers and a corresponding list of timestamps. The user session (also referred to as a session) may be initiated when the users access a web page of a server and end when the user prematurely terminates the session or completes the session. A prematurely terminated session does not gather enough information from the user to provide the service offered by the server. A completed session does gather enough information to provide the service offered by the server. For example, with a service that prepares tax forms, a user may prematurely terminate a session after getting stuck with one of the questions asked in a screen presented by the application.

In one embodiment, the trigger is one of a time-based trigger and a screen based trigger. A time based trigger is a trigger that is initiated in response to the expiration of a timer. For example, a user inactivity timer may initiate a trigger when the user has not performed any activity for a period of time (e.g., 10 minutes). A screen based trigger is a trigger that is initiated in response to the user accessing a particular screen of the application. Each screen has a unique identifier and the system may maintain a list of screen identifiers that, when accessed, initiate the trigger.

In one embodiment, the screen identifiers, of the list of screen identifiers, identify unique screens of a tax application. In one embodiment, a unique screen is one of a numbered set of screens that may be displayed to a user while the user interacts with an application. In one embodiment, the application is a tax application that prepares tax forms for the user. The screens of the tax application may present or request tax information to and from the user.

In one embodiment, the timestamps, of the list of timestamps, identify access times of screens corresponding to the list of screens during the user session. The timestamps in the list may correspond one-to-one to the screen identifiers of the list of screen identifiers.

At Step 204, the list of timestamps is converted to a list of time deltas. In one embodiment, a time delta is the value that results from subtracting two adjacent timestamps from the list of timestamps. A time delta identifies the amount of time that has lapsed between two timestamps.

In one embodiment, a time delta, of the list of time deltas, is generated from a first timestamp, from the list of timestamps, and a second timestamp, from the list of timestamps. The first timestamp corresponds to a first screen identifier, from the list of screen identifiers, and the second timestamp corresponds to a second screen identifier, from the list of screen identifiers.

At Step 206, a churn risk is generated from the list of screen identifiers (also referred to as screen data) and the list of time deltas (also referred to as temporal data). In one embodiment, the churn risk is generated using a machine learning model comprising a screen branch and a temporal branch. In one embodiment, the churn risk identifies a probability that the user session will be terminated.

The screen branch processes a screen identifier vector, generated from the list of screen identifiers. In one embodiment, the values of the elements of the screen identifier vector are the screen identifiers from the list of screen identifiers.

The temporal branch processes a time delta vector, generated from the list of time deltas. In one embodiment, the values of the elements of the time delta vector are the time deltas from the list of time deltas.

In one embodiment, an embedding layer of a set of screen branch layers of the screen branch of the machine learning model is applied to the screen identifier vector to generate an embedded vector. The embedding layer converts input values that incorporate a first number of dimensions to an output value with a second number of dimensions. For example, the input value may have a single dimension and the output value may have multiple dimensions (e.g., 5, 10, 100, etc.).

In one embodiment, a set of screen branch layers, including one or more screen convolutional layers and one or more screen pooling layers, is applied to the embedded vector to generate a screen vector. Applying a convolutional layer involves applying filters to successive windows of values from the input vector to generate a number of output values to form an output vector. Applying a pooling layer involves selecting a value (e.g., the maximum value) from a pool of values from the input vector. A pooling layer may be applied after a convolutional layer.

In one embodiment, a set of temporal branch layers, including one or more temporal convolutional layers and one or more temporal pooling layers, to a time delta vector to generate a temporal vector. The time delta vector includes the time deltas from the list of time deltas. The temporal vector may have the same number of dimensions as the screen vector and a different number of dimensions as the time delta vector (from which the temporal vector is generated).

In one embodiment, the screen vector is combined with the temporal vector to generate a combined vector. In one embodiment, the combination is made by concatenating the screen vector with the temporal vector.

In one embodiment, one or more dense layers are applied to the combined vector to generate the churn risk. A dense layer is a fully connected layer of a neural network. With a dense layer, each output is linked to each input with a weight. Each input is multiplied by the corresponding weight and the multiplicands are summed together to form the output. Additionally, a bias value may be added to the output value.

In one embodiment, a cardinality of screen output from a screen branch is harmonized with a cardinality of a temporal output from a temporal branch. For example, the input to the screen branch of a neural network may have a different cardinality (i.e., a different number of vector elements) from the input to the temporal branch of a neural network. The branches may use layers with different parameters and architectures to form intermediate outputs (i.e., outputs of layers within the branches) that have the same cardinality. For example, a screen branch may receive an input vector with a cardinality of 100 and temporal branch may receive an input vector with a cardinality of 99 making it difficult to combine the two input vectors. The screen branch and the temporal branch may apply one or more layers (convolutional layers, pooling layers, etc.) with different parameters (e.g., filter sizes and window sizes). The outputs of the layers may provide output vectors that have the same cardinality and facilitate combining the output vectors.

In one embodiment, the machine learning model, which includes multiple layers, is trained to generate the churn risk from the list of screen identifiers and the list of time deltas. In one embodiment, the training is performed by inputting training data (e.g., historical lists of screen identifiers and time deltas) to generate outputs that are compared to labels. The labels identify whether the sessions associated with the training data were terminated or not terminated. The difference between the outputs and the labels is fed back into the machine learning model using backpropagation to update the weights of the machine learning model.

At Step 208, an intervention is transmitted to intervene in the user session based on the churn risk. In one embodiment, the intervention is a message that is sent from a server a user device. In one embodiment, the intervention includes a popup presented to a user device. In one embodiment, the popup may offer a discount for the services provided to the user. In one embodiment, the popup offers to connect the user to an expert to help the user with the service being provided.

In one embodiment, the intervention is transmitted when the churn risk satisfies a threshold. For example, when the churn risk exceeds a value of 0.6, the intervention may be transmitted.

Figure 3:
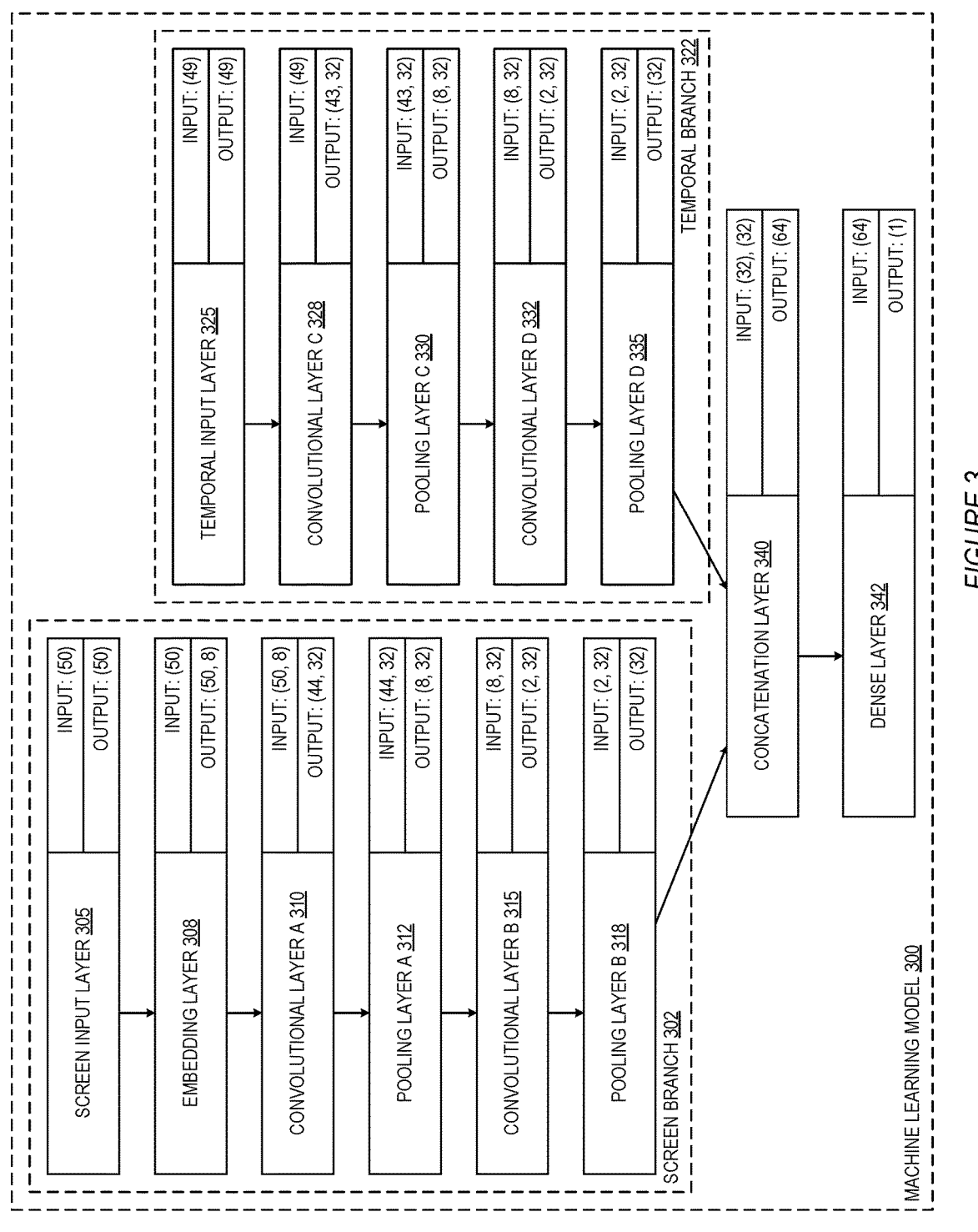
FIG. 3 and FIG. 4 show examples in accordance with disclosed embodiments.
Figure 4:
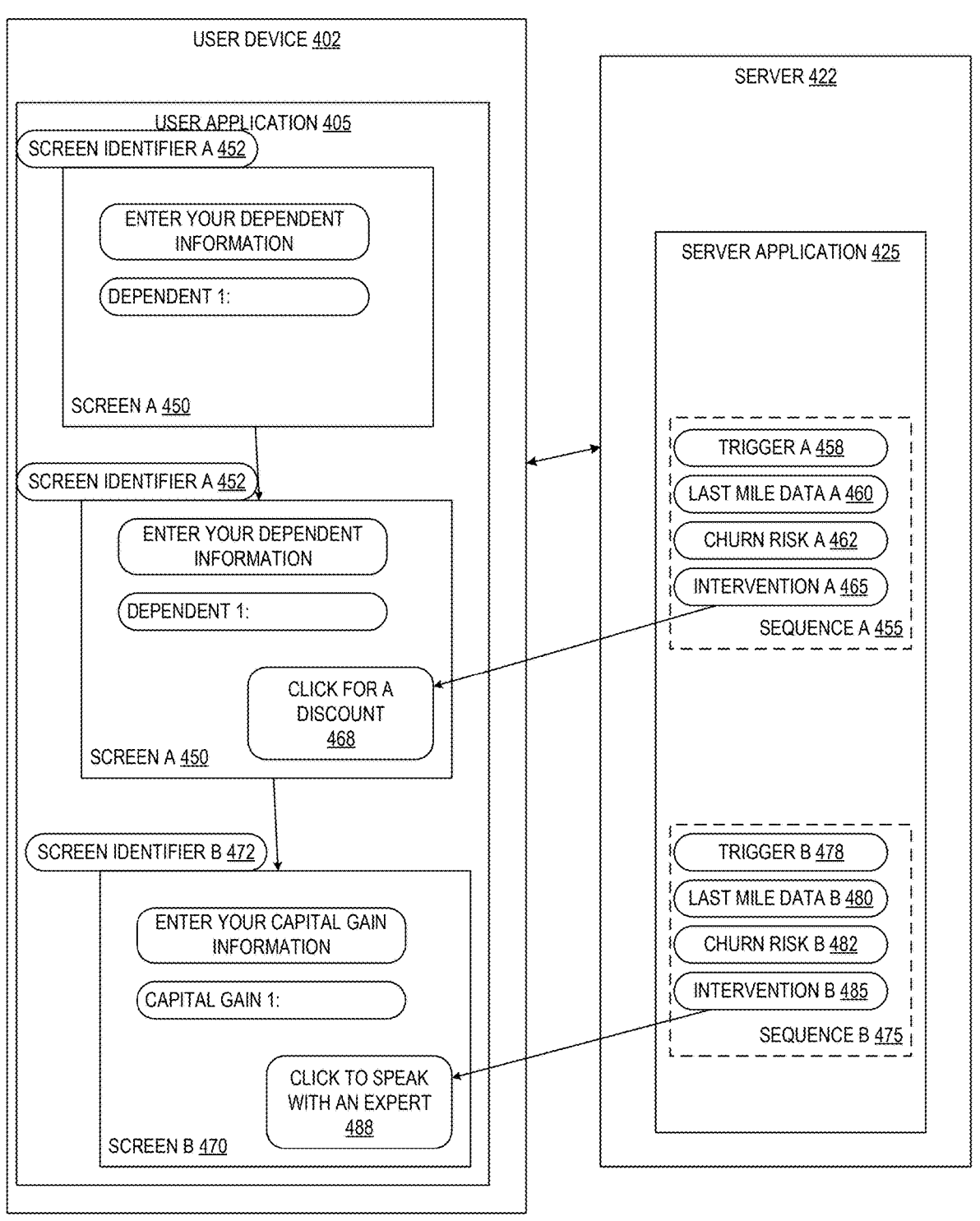

FIGS. 3 and 4 show examples in accordance with the disclosure. FIG. 3 shows an example of an architecture for a machine learning model in accordance with the disclosure. FIG. 4 shows an example of a system using last mile churn predictions to intervene in a user session. The embodiments shown in FIGS. 3 and 4 may be combined and may include or be included within the features and embodiments described in the other figures of the application. The features and elements of FIGS. 3 and 4 are, individually and as a combination, improvements to user response and machine learning technology and computing systems. The various features, elements, widgets, components, and interfaces shown in FIGS. 3 and 4 may be omitted, repeated, combined, and/or altered as shown. Accordingly, the scope of the present disclosure should not be considered limited to the specific arrangements shown in FIGS. 3 and 4.

Turning to FIG. 3, the machine learning model (300) includes multiple layers to generate a churn risk from screen data and temporal data. The machine learning model (300) includes the screen branch (302) and the temporal branch (322).

The screen branch (302) generates an output vector from screen data. The screen branch (302) includes the screen input layer (305), the embedding layer (308), the convolutional layer A (310), the pooling layer A (312), the convolutional layer B (315), and the pooling layer B (318).

The screen input layer (305) receives an input with 50 elements and generates an output with 50 elements. For example, the input to the screen input layer (305) may be the list of screen identifiers and the output of the screen input layer (305) is a 50 element output vector that is fed to the embedding layer (308).

The embedding layer (308) receives the output vector from the screen input layer (305) as an input vector and generates a multidimensional output vector with 400 elements split into a first set of 50 dimensions and a second set of 8 dimensions. The first set of dimensions correspond the dimensions (50) of the input vector. The second set of dimensions expands the number of dimensions for each element of the input (i.e., from 1) to 8 dimensions.

The convolutional layer A (310) receives the output vector from the embedding layer (308) as an input vector and generates an output vector with 1408 elements split into sets of 44 and 32 dimensions. The convolutional layer A (310) is a one dimensional convolutional layer that applies 32 filters (corresponding to the set of 32 dimensions) to the input vector (from the embedding layer (308)). Each filter has a width of 7 that scans across the set of 50 dimensions of the input vector with a stride length of 1, which yields the output vector having a set of 44 dimensions (i.e., (50÷1)–(7÷1)+1=44). Equation 1 below may be used to determine the number of output dimensions:

$$\text{Output dimensions} = \frac{\text{Input Dimensions}}{\text{Stride Length}} + \frac{\text{Filter Width}}{\text{Stride Length}} + 1 \quad \text{(Eq. 1)}$$

The pooling layer A (312) receives the output vector from the embedding layer (308) as an input vector and generates an output vector with 256 elements split into sets of 8 and 32 dimensions. The pooling layer A (312) identifies pools of the input vector and selects the maximum value from the pool to be the output from that pool for the output vector.

The convolutional layer B (315) receives the output vector from the pooling layer A (312) as an input vector and generates an output vector with 64 elements split into sets of 2 and 32 dimensions. The convolutional layer B (315) is a one dimensional convolutional layer that applies 32 filters (corresponding to the set of 32 dimensions) to the input vector (from the pooling layer A (312)). Each filter has a width of 4 that scans across the set of 8 dimensions of the input vector with a stride length of 4, which yields the output vector having a set of 2 dimensions (i.e., $(8 \div 4)-(4 \div 4)+1=2$).

The pooling layer B (318) receives the output vector from the convolutional layer B (315) as an input vector and generates an output vector with 32 elements split into one set of 32 dimensions. The pooling layer B (318) identifies pools of the input vector and selects the maximum value from the pool to be the output from that pool for the output vector. The output of the pooling layer B (318) may be referred to as a screen branch vector.

The temporal branch (322) generates an output vector from temporal data. The temporal branch (322) includes the temporal input layer (325), the convolutional layer C (328), the pooling layer C (330), the convolutional layer D (332), and the pooling layer D (335).

The temporal input layer (325) receives an input with 49 elements and generates an output with 49 elements. For example, the input to the temporal input layer (325) may be the list of time deltas and the output of the temporal input layer (325) is a 49 element output vector that is fed to the convolutional layer C (328).

The convolutional layer C (328) receives the output vector from the temporal input layer (325) as an input vector and generates an output vector with (1376) elements split into sets of 43 and 32 dimensions. The convolutional layer C (328) is a one dimensional convolutional layer that applies 32 filters (corresponding to the set of 32 dimensions) to the input vector (from the embedding layer (308)). Each filter has a width of 7 that scans across the set of 49 dimensions of the input vector with a stride length of 1, which yields the output vector having a set of 43 dimensions (i.e., $(49 \div 1)-(7 \div 1)+1=43$).

The pooling layer C (330) receives the output vector from the embedding layer (308) as an input vector and generates an output vector with 256 elements split into sets of 8 and 32 dimensions. The cardinality of the dimensions (i.e., the number of dimensions) of the output vector of the pooling layer C (330) is the same as the cardinality of the dimensions of the output vector of the pooling layer A (312) in the screen branch (302). The pooling layer C (330) (of the temporal branch (322)) identifies pools of the input vector and selects the maximum value from the pool to be the output from that pool for the output vector.

The convolutional layer D (332) receives the output vector from the pooling layer C (330) as an input vector and generates an output vector with 64 elements split into sets of 2 and 32 dimensions. The convolutional layer D (332) is a one dimensional convolutional layer that applies 32 filters (corresponding to the set of 32 dimensions) to the input vector (from the pooling layer C (330)). Each filter has a width of 4 that scans across the set of 8 dimensions of the input vector with a stride length of 4, which yields the output vector having a set of 2 dimensions (i.e., $(8 \div 4)-(4 \div 4)+1=2$).

The pooling layer D (335) receives the output vector from the convolutional layer D (332) as an input vector and generates an output vector with 32 elements split into one set of 32 dimensions. The pooling layer D (335) identifies pools of the input vector and selects the maximum value from the pool to be the output from that pool for the output vector. The output of the pooling layer D (335) may be referred to as a temporal branch vector.

The concatenation layer (340) receives a screen branch vector from the screen branch (302) and a temporal branch vector from the temporal branch (322). The concatenation layer (340) combines the 32 element screen branch vector with the 32 element temporal branch vector by concatenating the vectors together to form a single vector output with 64 elements from two 32 element vectors.

The dense layer (342) receives a combined vector from the concatenation layer (340) and generates a scaler value (i.e., a single value) output in the range from 0 to 1, which is a churn risk. The dense layer (342) multiples a set of weights to the combined vector, adds the multiplicands together, and adds a bias to form the churn risk.

Turning to FIG. 4, the system (400) includes the user device (402) and the server (422). The user device (402) is operated by a user to fill out a tax form by accessing the server (405). The user device (402) may be a mobile phone, a desktop computer, etc. The user opens the user application (405), which may be a browser or native application, and accesses the server application (425) to initiate a session.

The server (422) sends files (e.g., web pages) to the user device (402), which are rendered and displayed as the screen A (450) by the user application (405) on the user device (402). The screen A (450) is identified with the screen identifier A (452) by the server application (425).

The screen A (450) asks the user to input information about the dependents of the user. The user does not take action for a prolonged period of time, which initiates the sequence A (455) on the server application (425).

The sequence A (455) is initiated by the trigger A (458). The trigger A (458) is a time based trigger that is activated after a defined period of inactivity by the user, e.g., about 10 minutes. After the trigger A (458) is activated, the server retrieves the last mile data A (460).

The last mile data A (460) includes a list of screen identifiers for the last 50 screens viewed with the user device (402) by the user. The last mile data A (460) also includes a list of timestamps for the last 50 screens to identify when the screens were viewed. The last mile data A (460) is input to a machine learning model (e.g., the machine learning model (300) of FIG. 3) to generate the churn risk A (462).

The churn risk A (462) is generated by the server (422) in response to the trigger A (458) from the las mile data A (460). The server (422) compares the churn risk A (462) to a threshold and determines that the session is at risk of being prematurely terminated (e.g., the churn risk is greater than a threshold of about 0.5) and generates the intervention A (465).

The intervention A (465) is a message generated by the server (422) in response to the churn risk A (462) satisfying a threshold to indicate that the user may prematurely terminate the session. The intervention A (465) is transmitted to the user device (402).

The user device (402) receives the intervention A (465). In response, the user device (402) updates the screen A (450) to display the intervention A (465) as the popup (468).

The popup (468) is displayed on the screen A (450) after a prolonged period of inactivity of the user when the server (422) determines that the churn risk A (462) (the risk that the user will quit the session prematurely) is too high. The popup (468) presents a discount to the user to reduce the risk of prematurely ending the session.

The user continues the session and navigates to the screen B (470), which is identified with the screen identifier B (472). When the screen B (470) is accessed, the sequence B (475) is initiated by the trigger B (478).

The trigger B (478) is a screen based trigger that is activated when the user accesses one of a predefined list of screens, including the screen B (470). After the trigger B (478) is activated, the server retrieves the last mile data B (480).

The last mile data B (480) includes a list of screen identifiers for the last 50 screens viewed with the user device (402) by the user. The last mile data B (480) is updated from the last mile data A (460) to include the screen A (450) and any additional screens the user has viewed prior to accessing the screen B (470). The last mile data B (480) also includes a list of timestamps for the last 50 screens to identify when the screens were viewed. The last mile data B (480) is input to the machine learning model to generate the churn risk B (482).

The churn risk B (482) is generated by the server (422) in response to the trigger B (478) from the las mile data B (480). The server (422) compares the churn risk B (482) to a threshold and determines that the session is at risk of being prematurely terminated (e.g., the churn risk B (482) is greater than a threshold of about 0.4) and generates the intervention B (485). In one embodiment, the threshold used in the sequence B (475) for a screen based trigger may be different from the threshold used in the sequence A (455) for a time based trigger.

The intervention B (485) is a message generated by the server (422) in response to the churn risk B (482) satisfying a threshold to indicate that the user may prematurely terminate the session. The intervention B (485) is transmitted to the user device (402).

The user device (402) receives the intervention B (485). In response, the user device (402) displays the intervention B (485) as the popup (488) with the screen B (470).

The popup (488) is displayed on the screen B (470) when the server (422) determines that the churn risk B (482) (the risk that the user will quit the session prematurely) is too high. The popup (488) includes a button to connect the user to an expert for help with filling out the information for the screen B (470).

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and (508)) may be locally or remotely connected to the computer processor(s) (502), non-persistent storage (504), and persistent storage (506). Many different types of computing systems exist, and the aforementioned input and output device(s) (510 and (508)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
retrieving data during a user session in response to a trigger, the data comprising a list of screen identifiers and a corresponding list of timestamps, wherein the list of screen identifiers comprises a screen identifier that identifies a unique screen displayed to a user and the list of timestamps comprises a timestamp that identifies an access time of the unique screen;
converting the list of timestamps to a list of time deltas, wherein the list of time deltas comprises a time delta that identifies an amount of time between two timestamps of the list of timestamps;
processing, by a screen branch of a machine learning model, a screen identifier vector generated from the list of screen identifiers to generate a screen output;
processing, by a temporal branch of the machine learning model, a time delta vector generated from the list of time deltas to generate a temporal output,
wherein the screen branch of the machine learning model is separate from the temporal branch of the machine learning model, and
wherein the screen branch and temporal branch operate in parallel;
harmonizing a cardinality of the screen output from the screen branch with a cardinality of the temporal output from the temporal branch to obtain a screen branch vector and a temporal branch vector having the same cardinality;
concatenating the screen branch vector and the temporal branch vector to form a combined vector;

generating a scalar value from the combined vector as a churn risk, wherein the churn risk identifies a probability that the user session will be terminated; and transmitting an intervention to intervene in the user session based on the churn risk.

2. The method of claim 1, further comprising:

transmitting the intervention, which comprises a popup presented to a user device.

3. The method of claim 1, further comprising:

transmitting the intervention when the churn risk satisfies a threshold.

4. The method of claim 1, wherein the trigger is one of a time-based trigger and a screen based trigger.

5. The method of claim 1, wherein the screen identifiers, of the list of screen identifiers, identify unique screens of a tax application.

6. The method of claim 1, wherein the timestamps, of the list of timestamps, identify access times of screens corresponding to the list of screens during the user session.

7. The method of claim 1, further comprising:

generating a time delta in the list of time deltas from a first timestamp, from the list of timestamps, and a second timestamp, from the list of timestamps, wherein the first timestamp corresponds to a first screen identifier, from the list of screen identifiers, and the second timestamp corresponds to a second screen identifier, from the list of screen identifiers.

8. The method of claim 1, further comprising:

applying an embedding layer, of a set of screen branch layers, to the screen identifier vector, comprising the list of screen identifiers, to generate an embedded vector.

9. The method of claim 1, further comprising:

applying a set of screen branch layers of the screen branch, comprising one or more screen convolutional layers and one or more screen pooling layers, to an embedded vector to generate the screen branch vector; and applying a set of temporal branch layers of the temporal branch, comprising one or more temporal convolutional layers and one or more temporal pooling layers, to the time delta vector, comprising the list of time deltas, to generate the temporal branch vector.

10. The method of claim 1, further comprising:

training the machine learning model comprising a plurality of layers to generate the churn risk from the list of screen identifiers and the list of time deltas.

11. A system comprising:

a risk controller, including a machine learning model and configured to generate a churn risk;

an intervention controller configured to generate an intervention;

a server application executing on one or more servers and configured to execute:

retrieving data during a user session in response to a trigger, the data comprising a list of screen identifiers and a corresponding list of timestamps, wherein the list of screen identifiers comprises a screen identifier that identifies a unique screen displayed to a user and the list of timestamps comprises a timestamp that identifies an access time of the unique screen, converting the list of timestamps to a list of time deltas, wherein the list of time deltas comprises a time delta that identifies an amount of time between two timestamps of the list of timestamps, processing, by a screen branch of the machine learning model, a screen identifier vector generated from the list of screen identifiers to generate a screen output, processing, by a temporal branch of the machine learning model, a time delta vector generated from the list of time deltas to generate a temporal output, wherein the screen branch of the machine learning model is separate from the temporal branch of the machine learning model, and wherein the screen branch and the temporal branch operate in parallel, harmonizing a cardinality of the screen output from the screen branch with a cardinality of the temporal output from the temporal branch to obtain a screen branch vector and a temporal branch vector having the same cardinality, concatenating the screen branch vector and the temporal branch vector to form a combined vector, generating, by the risk controller, a scalar value from the combined vector as the churn risk, wherein the churn risk identifies a probability that the user session will be terminated; and transmitting, by the intervention controller, the intervention to intervene in the user session based on the churn risk.

12. The system of claim 11, wherein the server application is further configured to execute:

transmitting, by the intervention controller, the intervention, which comprises a popup presented to a user device.

13. The system of claim 11, wherein the server application is further configured to execute:

transmitting the intervention when the churn risk satisfies a threshold.

14. The system of claim 11, wherein the server application is further configured to execute:

generating, by the risk controller, the churn risk, which identifies the probability that the user session will be terminated.

15. The system of claim 11, wherein the trigger is one of a time-based trigger and a screen based trigger.

16. The system of claim 11, wherein the screen identifiers, of the list of screen identifiers, identify unique screens of a tax application.

17. The system of claim 11, further comprising:

a training application executing on the one or more servers and configured to execute training the machine learning model comprising a plurality of layers to generate the churn risk from the list of screen identifiers and the list of time deltas.

18. A method, comprising:

accessing a screen as part of a user session, wherein data is retrieved during the user session in response to a trigger, the data comprising a list of screen identifiers and a corresponding list of timestamps, wherein the list of timestamps is converted to a list of time deltas, wherein a churn risk is generated from the list of screen identifiers and the list of time deltas, by:

processing, by a screen branch of a machine learning model, a screen identifier vector generated from the list of screen identifiers to generate screen output, processing, by a temporal branch of the machine learning model, a time delta vector generated from the list of time deltas to generate temporal output, wherein the screen branch of the machine learning model is separate from the temporal branch of the machine learning model, and wherein the screen branch and the temporal branch operate in parallel, harmonizing a cardinality of the screen output from the screen branch with a cardinality of the temporal output from the temporal branch to obtain a screen branch vector and a temporal branch vector having the same cardinality, concatenating of the screen branch vector and the temporal branch vector to generate a combined vector, and generating a scalar value from the combined vector as the churn risk; and wherein an intervention is generated to intervene in the user session based on the churn risk; and displaying the intervention.

\* \* \* \* \*